United States Patent [19]

Koyama

[11] 3,912,205

[45] Oct. 14, 1975

[54] RECORDING AND/OR REPRODUCING APPARATUS WITH AUTOMATICALLY STOPPING APPARATUS

[75] Inventor: Tsuneyuki Koyama, Tokyo, Japan

[73] Assignee: Victor Company of Japan, Limited, Japan

[22] Filed: Dec. 19, 1973

[21] Appl. No.: 426,334

[52] U.S. Cl. .......... 242/188; 242/195

[51] Int. Cl.$^2$ .......... B65H 59/38; G03B 1/04; G11B 1/52; G11B 15/06

[58] Field of Search .......... 242/188, 195; 360/71–74

[56] References Cited

UNITED STATES PATENTS 3,515,391 6/1970 Nakamura et al. .......... 360/74

*Primary Examiner*—Leonard D. Christian

[57] ABSTRACT

An automatically stopping, recording and/or reproducing apparatus comprises means for detecting a tape-shaped detectable leader part fixed to an end of a tape-shaped recording medium. The apparatus is automatically stopped when the detecting means detects the detectable leader part when the apparatus is starting and the detecting means continues to detect the detectable leader part even after the elapse of a predetermined time thereafter.

4 Claims, 4 Drawing Figures

RECORDING AND/OR REPRODUCING APPARATUS WITH AUTOMATICALLY STOPPING APPARATUS

BACKGROUND OF THE INVENTION

This invention relates generally to a recording and/or reproducing apparatus with means for automatically stopping it.

More particularly, the invention relates to tape recording/reproducing apparatus which is automatically stopped responsive to detection of a detachable part, such as a transparent leader tape part, fixed to an end of a tape recording medium. The leader is detected at the start of the operational mode of the apparatus and it is still being detected after the elapse of a predetermined time.

In general, the invention refers to a video recording-/reproducing apparatus of the automatic tape loading type, wherein a tape cassette is used. At the time of recording/reproducing, a magnetic tape of ¾-inch width is drawn out of the cassette and is loaded into an extremely complicated tape path. The tape is wrapped in contact over a desired circumferential extent of a guide drum having a rotating head. The magnetic tape is driven responsive to a relatively large driving power, to travel through the path. For this reason, while the apparatus continues to be in its recording/reproducing mode, the magnetic tape is paid out from its spool to its terminal end part. This terminal end of the tape separates from the spool. As a result of this undesirable separation occurrence, the cassette becomes defective, because the tape end is drawn out of the cassette.

For preventing such an occurrences, an expedient in a known video recording/reproducing apparatus of a cassette type, has been the incorporation therein of a so-called auto-stopping mechanism for automatically stopping the travel of the magnetic tape when the tape has been drawn out to the vicinity of the terminal end. In addition, a so-called auto-rewinding mechanism rewinds the tape by a certain length.

However, in an apparatus provided with an auto-stopping mechanism, it is difficult to determine the quantities of the tape respectively wound on the take-up spool and the supply spool, when the apparatus is in the auto-stopping state. For this reason, there continues to be trouble if a cassette, in which almost all of the tape has already been wound on the take-up spool, is inserted into a loaded position. The apparatus may then be operated in the recording/reproducing or fast-forwarding mode, and the tape will be driven further in the forward direction, whereby the terminal end of the tape will be pulled off the supply spool.

This undesirable occurrence can be prevented by providing detectable parts at the two ends of the tape. These parts may be transparent leaders having different character wherein a detection device can detect and discriminate between the two end parts. However, such a provision will inevitably add to the complexity and price of the apparatus.

Furthermore, in a recording/reproducing apparatus in which an auto-rewinding mechanism is incorporated, the above described occurrence is prevented since a part of the tape is at the front face of the cassette. A detectable tape part is not positioned there when this mechanism operates, to cause the tape to stop traveling. However, this requires a complicated mechanism for changing the apparatus into the rewinding or fast-forwarding mode in order to reverse temporarily the travel of the tape when the detection device detects the detectable tape part, whereby the apparatus becomes expensive. Moreover, in this apparatus, also, the above described undesirable occurrence will occur when a cassette is loaded into the apparatus in a tape winding state wherein the detectable tape part has already been paid out to the front face of the cassette.

SUMMARY OF THE INVENTION

Accordingly, a general object of the present invention is to provide a novel and useful recording/reproducing apparatus with automatically stopping means which eliminates the various difficulties described above.

A specific object of the invention is to provide an automatically stopping, recording/reproducing apparatus adapted to be placed in the stopped mode when, during the travel of a tape a detectable part thereof is detected after the start of operation of the apparatus. This detectable part may still be detected after the elapse of a predetermined time thereafter.

Another object of the invention is to provide an automatically stopping, recording/reproducing apparatus. Here, an object is to maintain the operational mode while a detection means is detecting a recording medium part of a tape structure after the elapse of a predetermined time following the start of the operation of the apparatus. The tape structure travels as a detectable part thereof, detected after the start of the operation.

A further object of the invention is to provide an automatically stopping, recording/reproducing apparatus which automatically stops when a detectable part of a tape recording medium reaches a predetermined point. Here, an object is to automatically stop the tape when the detectable part is detected after the start of the operation of the apparatus. The detectable part is still being detected even after the elapse of a predetermined time therefrom.

Other objects and further features of the invention will be apparent from the following detailed description when read in conjunction with the accompanying drawings.

DETAILED DESCRIPTION

Figure 1:
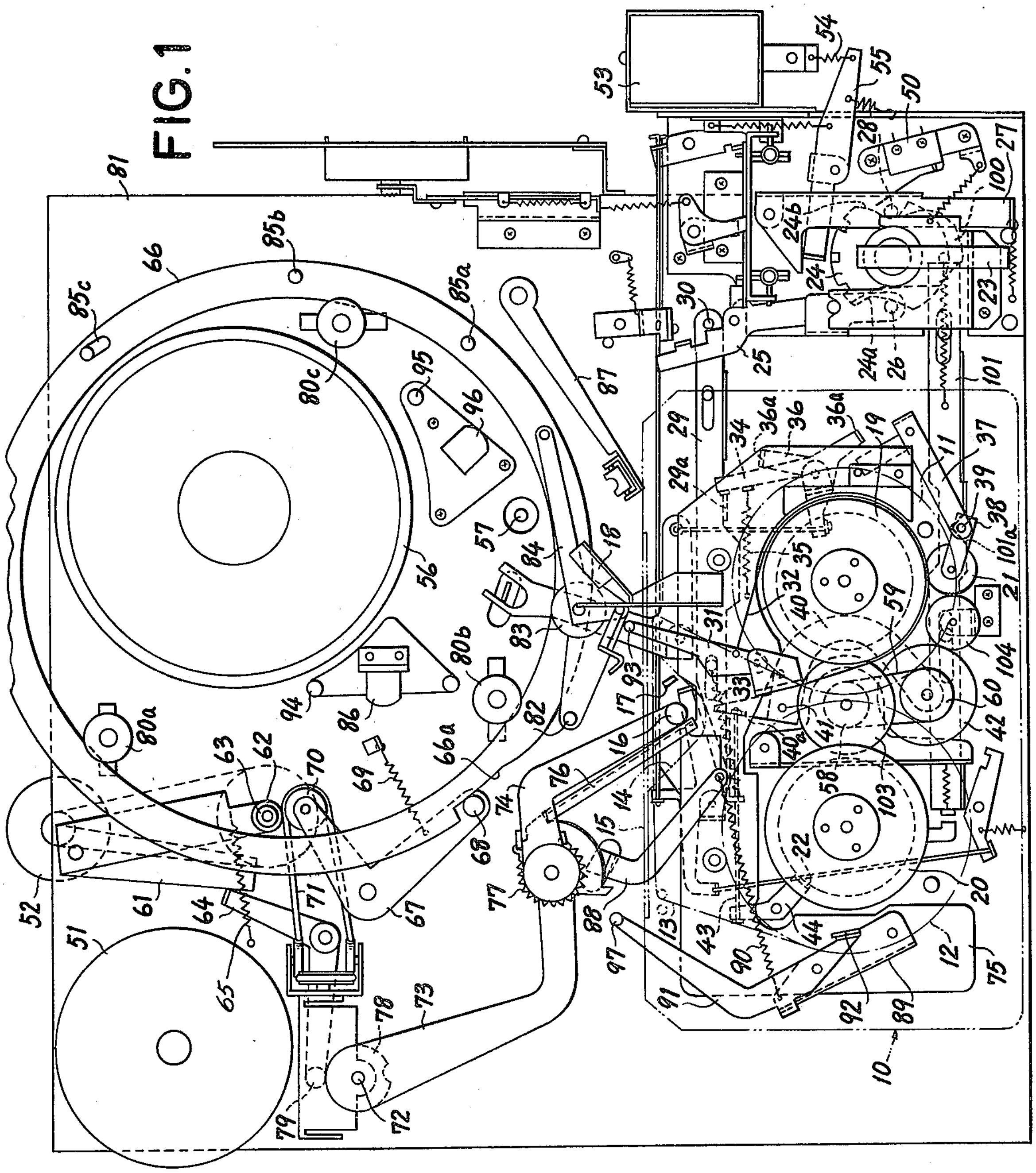
FIG. 1 is a plan view showing one embodiment of the recording/reproducing apparatus with an automatically stopping apparatus, according to the invention, with the structure shown in a stopped mode.

A cassette 10 contains therein a supply tape roll 11 and a take-up tape roll 12. A magnetic tape 13 paid out from the supply tape roll 11 is guided by guide pins and reaches the take-up tape roll 12. The cassette 10 is provided at the front face and front part of the bottom face of its casing with a cut-out opening 14, which is normally covered by an opening and closing window 15. The window is closed when the cassette is not being used, whereby the magnetic tape 13 within the cassette is protected. When the cassette 10 is inserted into the prescribed loading position, the window 15 opens. Simultaneously, a guide pole 16 and a photcell 17 enter into the opening 14. The photocell 17 and a lamp 18 are disposed to confront each other and constitute a detecting device. The magnetic tape 13 is interposed between the photocell and the lamp.

First, the loading operation carried out as a result of a manipulation for playing will be described. When the apparatus is in the stopped state as indicated in FIG. 1, a reel disc 19 on the supply side and a reel disc 20 on the take-up side are respectively being pressed by a roller 21 and a brake shoe 22. When a control lever 23 is turned clockwise, a cam 24 for playing rotates unitarily therewith. A rotatable lever 25 for playing is rotated counterclockwise, its pin 26 being guided by a cam surface 24*a* of the cam 24. Similarly, a detection lever 27 is rotated counterclockwise, its pin 28 being guided by a cam surface 24*b* of the cam 24.

Figure 2:
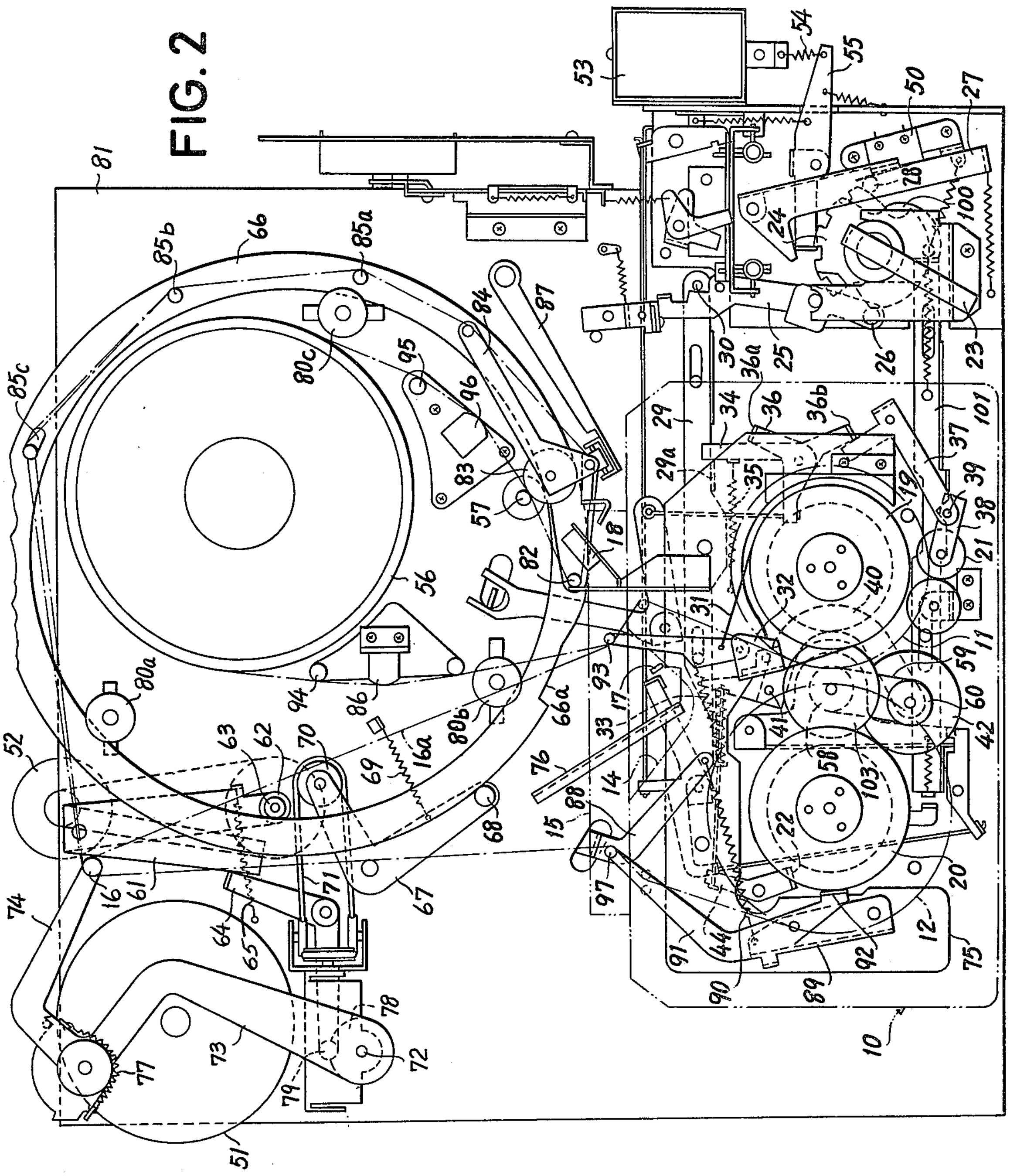
FIG. 2 is a plan view showing the apparatus illustrated in FIG. 1, with the structure shown in the recording/reproducing mode.

As a result of the rotation of the rotatable lever 25, a slide plate 29 coupling the control mechanism and the reel-disc-driving mechanism slides toward the right to its, as indicated in FIG. 2, its pin 30 being engaged. As a result of this sliding movement of the slide plate 29, a tension lever 31 on the supply side is released from its engaged state. As a result, the lever 31 is rotated in the counterclockwise direction by a spring 33. A brake band 32, disposed around the periphery of the reel disc 19, is tightened. Accordingly, the tension servomechanism is placed in the operation state.

Furthermore, a detection lever 34 is engaged by an engagement part 29*a* of the slide plate 29 and is turned clockwise against the force of a spring 35. Interrelatedly with this movement, a substantially Y-shaped rotating member 36 is rotated clockwise, a bent part 36*a* being engaged. Consequently, an L-shaped lever 37 is engaged at one of its arms by a bent part 36*b* of the rotating member 36 and is thereby rotated in the counterclockwise direction. The roller 21, is rotatably held by a lever 38 pivoted on the outer end of the other arm of the lever 37. Lever 38 rotates within a specific angular range around a shaft 39 whereupon roller 21 separates from the supply reel disc 19. As a result, the supply reel disc 19 is released from braking force.

As another result of the above described sliding movement of the slide plate 29, a curved lever 40 is engaged at an elastic engagement part 40*a* thereof by a projection 29*b* of the slide plate 29 and is rotated clockwise relative to a shaft 41. As a consequence, a drive roller 42 rotatably held at the end of the curved part of the lever 40 is pressed against the take-up reel disc 20. Roller 42 supplies drive power during driving. Furthermore, the above mentioned rotation of the lever 40 is transmitted by way of a connector 43 to rotate a brake lever 44 clockwise. The reel disc 20 is released from the braking force applied by the brake shoe 22.

As a result of the above mentioned rotation of the detection lever 27, a microswitch 50 (switch SW in FIG. 4) is closed. A power source circuit is closed to a main motor 51, a loading motor 52, and a solenoid 53. The solenoid 53 thereupon operates to retract its plunger rod, whereupon the tension of a spring 54 is increased. A rotatable lever 55 (for locking) is turned counterclockwise. Furthermore, the cam 24 (for playing) and the control lever 23 are locked in their rotational positions indicated in FIG. 2.

The rotation of the main motor 51 is transmitted as a clockwise rotation by way of power transmission means such as belts and pulleys, respectively, to rotating video heads (not shown) provided within a guide drum 56, a capstan 57, and pulley 58 in a neutral position. The rotation of the pulley 58 is transmitted further by way of a belt 59 to a pulley 60. Still further, power is transmitted by way of a roller 42, which is integral with the pulley 60, to the take-up reel disc 20. The resulting torque acts in the tape take-up direction.

The rotation of the loading motor 52 is transmitted, by a belt and pulleys, to rotate a belt drive roller 62 of a two-stage construction. Ring drive roller 63 is rotatably held at the outer end of a channel-shaped rotatable lever 61. At this time, the lever 61 is in a position to which it has been rotated counterclockwise, against the force of a spring 65. The lever 61 is engaged by a bent part of one arm of an L-shaped lever 64. The roller 63 is separated from the inner peripheral surface of a revolving ring 66. A pin 68 fixed to the outer end of one arm of an L-shaped lever 67 fits into a cutout 66a of the ring 66. The lever 67 is in a position to which it has been rotated counterclockwise by a spring 69. A belt 71 passed around a pulley 70, provided on the outer end of the other arm of the lever 67, is pressed against the above mentioned drive roller 62. Consequently, the rotation of the motor 52 is transmitted by way of the roller 62 to the belt 71. The resulting movement of the belt 71 is further transmitted through a speed-reduction mechanism comprising parts such as pulleys, worm gear, or sprockets. After being thus reduced in speed, belt movement is transmitted as a counterclockwise rotation to a rotating shaft 72.

As a result of the rotation of this shaft 72, a first guide arm 73, fixed to the upper part thereof, is rotated in the counterclockwise direction. When the first guide arm 73 is thus rotated, it moves a second guide arm 74 attached to its outer end. This attachment permits a free rotation of guide arm 74 within a specific angular range, guided at its outer end by a guide member 76 fixed to a sub-chassis 75. Thus, the tension of a spring 77 rotates arm 74 in the clockwise direction relative to the first guide arm 73. As the guide pole 16 is extracted from the interior of the cassette 10 through the cutout opening 14, it catches the magnetic tape 13 and draws it horizontally out of the cassette. The shaft 72 rotates through a specific angle, and the first and second guide arms 73 and 74 move to predetermined positions as indicated in FIG. 2, the tape 13 which has been drawn out of the cassette 10 forms an approximately triangular tape loop 13*a* in the same plane as the cassette.

When the shaft 72 rotates to the above mentioned position, a pin 79 is pressed against and brought into engagement with a cam 78 which is integral with the shaft 72. At the periphery of the cam, pin 79 fits into a recess. This causes the L-shaped lever 61 to rotate in the counterclockwise direction and the channel-shaped rotatable lever 61 to rotate in the clockwise direction, in an intercoupled manner, responsive to the force of the spring 65. The rotation of the lever 61 causes the drive roller 63 to be pressed against the inner peripheral surface of the revolving ring 66, whereby a clockwise torque is imparted to this ring 66. When the ring 66 thus begins to rotate clockwise, the pin 68 is extracted from the cutout 66*a* and contacts the outer peripheral surface of the ring, at which time, the lever 67 is turned clockwise against the force of the spring 69. Consequently, the belt 71 separates from the drive roller 63, and terminates the transmission of torque to rotating shaft 72. At the same time, the shaft 72 is locked by locking means (not shown) in the above mentioned rotational position.

The revolving ring 66 is revolvably held by guide rollers 80*a*, 80*b*, and 80*c* with an inclination relative to the chassis 81 of the apparatus, such that the left lower side of the ring (as viewed in FIG. 1) is the lowest part thereof. Furthermore, a pinch roller support lever 84, on the upper face of this ring 66, supports a tape guide pole 82 and a pinch roller 83. Lever 84 is subjected to a counterclockwise torque by a torsion spring (not shown). Guide pins are similarly fixed thereto.

When the ring 66 revolves clockwise, the leading guide pole 82, moves out of the tape loop 13*a*, intercepts and engages the tape 13. Then, as the ring continues to revolve, the tape 13 is pulled around, being engaged by the guide pole 82, and is wrapped against a guide drum 56. This guide drum 56 has a rotating video head (not shown), which is rotated by the main motor 51. Its head tip faces outwardly from the outer peripheral surface of the drum. The head is mounted on the chassis 81 with an inclination such that the side confronting an erasing head 86 is low, since the recording track is formed obliquely on the magnetic tape 13.

The revolving ring 66 revolves to the final position indicated in FIG. 2. A microswitch (not shown) at a specific position operates to stop the loading motor 52. Simultaneously, a solenoid (not shown) is activated, whereby a pinch roller pressing lever 87 is moved into its operative position. Consequently, the pinch roller 83 is pressed against the capstan 57 with the magnetic tape 13 interposed therebetween, whereby the tape is clamped and driven.

Interrelatedly with the turning of the above mentioned pressing lever 87, an operating lever 88 is moved to the operative position indicated in FIG. 2. A holder 89 is rotated clockwise by the increased tension of a spring 90, acting against the force of another spring (not shown). Accordingly, a take-up tension lever 91 held within the holder 89 similarly moves to the operative position. A brake shoe 92 is pressed against the take-up reel disc 20, whereupon the tension servomechanism is placed in the operative state.

In the above described operational state, the apparatus is changed over from the loading mode of operation to the reproducing mode. In this state of the apparatus, the magnetic tape which has been drawn out from the supply tape roll 11 within the cassette 10 is guided by a tension pole 93. The tape tension is maintained constant. The tape is pressed into contact, over its entire width, with the erasing head 86. Then, at the time for recording, the tape is erased over its full width (but not erased at the time of reproducing) and is wrapped in contact, obliquely around the guide drum 56 and over a specific angular region determined by guide poles 94 and 95. Recording or reproducing of video signals is carried out.

Then, after being pressed against a head block 96 for recording or reproducing of audio signals and/or control signals, the tape 13 arrives at the position between the capstan 57 and the pinch roller 83. The tape 13 is clamped between and driven by the capstan 57 and the pinch roller 83. Further, the tape is guided by the guide pole 82 to be inverted, through approximately 180 degrees, in its direction of advance and is then guided by the guide pins 85*a*, 85*b*, and 85*c*. Then, after being further guided by the guide pole 16 and a tension pole 97, the tape enters the cassette 10 and is taken up on the take-up tape roll 12. In the tape path in the above described recording/reproducing mode of operation, also, the magnetic tape 13 is interposed between the lamp 18 and the photocell 17, whereby the light projected from the lamp 18 toward the photocell 17 is shut off by the magnetic tape 13.

Next, the rewinding and fast-forwarding operations of the above described recording/reproducing apparatus will be described, beginning with the rewinding operation. With the apparatus stopped, as indicated in FIG. 1, the control lever 23 is pressed downwardly and turned counterclockwise. By this manipulation, a cam 100 is rotated for fast forwarding and rewinding. The detection lever 27 is turned, whereby the microswitch 50 is operated. As a result, the main motor 51 and the solenoid 53 are activated. The control lever is locked in the rewinding operation position, particularly by the operation of the solenoid 53, as described hereinbefore.

Furthermore, for fast forwarding and rewinding, the rotation of the cam 100 causes a sliding plate 101 to move toward the right. The L-shaped lever 37 is rotated counterclockwise against the force of a spring (not shown) when the shaft 41 disengages from a V-shaped cutout 101*a* formed in the sliding plate 101. The roller 21 separates from the supply reel disc 19. As another result of the above mentioned movement of the sliding plate 101, for fast forwarding/rewinding a rotating lever 102 is engaged at its outer end and turned counterclockwise. A driving roller 103 supplies the power for fast forwarding/rewinding, by rotating clockwise unitarily with the pulley 58. Roller 103 is pressed against the supply reel disc 19. Consequently, the reel disc 19 is rotated in the counterclockwise direction, that is, in the tape take-up direction. The rewinding operation is carried out with the magnetic tape 13 accommodated within the cassette 10.

Next, the fast-forwarding operation will be described. With the apparatus stopped, as indicated in FIG. 1, the control lever 23 is pressed downwardly and turned clockwise. The cam 100 thereupon rotates in the same manner as at the time of rewinding operation, and the main motor 51 and the solenoid 53 are operated. The control lever 23 is thereby locked particularly by the operation of the solenoid 53, in the fast-forwarding operating position.

As a consequence of the above rotation of the cam 100, the sliding plate 101 is engaged at its right end part and moved toward the left. The L-shaped lever 37 is turned counterclockwise, whereby the roller 21 separates away from the reel disc 19. Furthermore, the rotating lever 102, following up the above mentioned movement of the sliding plate 101, is turned clockwise. Rotating clockwise the driving roller 103 is pressed against the take-up reel disc 20. Consequently, the reel disc 20 is rotated in the counterclockwise direction, that is, the tape take-up direction. The tape fast-forwarding operation is carried out with the magnetic tape 13 in its state of accommodation within the cassette 10.

Figure 3:
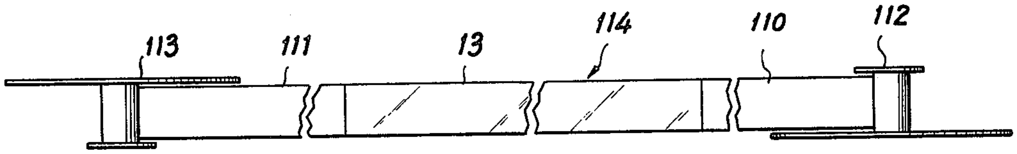
FIG. 3 is a diagrammatic side view, with parts cut away for foreshortening, showing one example of a tape accommodated within the cassette shown in FIGS. 1 and 2.

The construction of a tape 114 accommodated within the cassette is shown in a simplified manner in FIG. 3. This tape 114 comprises the magnetic tape 13 and transparent leader tape parts 110 and 111 of specific lengths, which are connected to the two ends of the tape 13. The free ends of the transparent leader tape parts 110 and 111 are respectively fixed to the hubs of a supply spool 112 and a take-up spool 113. The respective lengths of the transparent leader tape parts 110 and 111 are, for example, 90 ± 10 cm.

The organization and operation of a circuit for operating cooperatively with the above described recording/reproducing apparatus will now be described, with reference to FIG. 4. In this circuit shown in FIG. 4, a normally open type microswitch SW is closed by the control manipulation of the control lever 23 to the positions for recording/reproducing, rewinding, and fast forwarding as described hereinbefore. This circuit includes a delay circuit 115 comprising a resistor $R_1$, a capacitor $C_1$, a diode $D_6$ and having a time constant for imparting a delay time of 3 seconds. An AND gate 116, for positive input signals, has diodes $D_1$, $D_2$, and a resistor $R_2$. A differential circuit 117 comprises a capacitor $C_2$ and a resistor $R_3$. A detection device 118 comprises the photocell (CdS) 17 and the lamp 18. An amplification circuit 119 comprises transistors $Tr_1$ and $Tr_2$ and resistors $R_4$ through $R_8$. A switching circuit 120 comprises a transistor $Tr_3$, a resistor $R_9$, and a diode $D_3$. A stopping circuit 121 comprises a transistor $Tr_4$, resistors $R_{10}$, $R_{11}$, and $R_{12}$, and a diode $D_4$. A solenoid driving circuit 122 comprises a transistor $Tr_5$ and a diode $D_5$.

First to be described is the operation of the apparatus when it is manipulatively controlled with a cassette 10 inserted in the prescribed position in the apparatus, and the magnetic tape 13 part of the tape structure 114 is interposed between the lamp 18 and the photocell 17.

Figure 4:
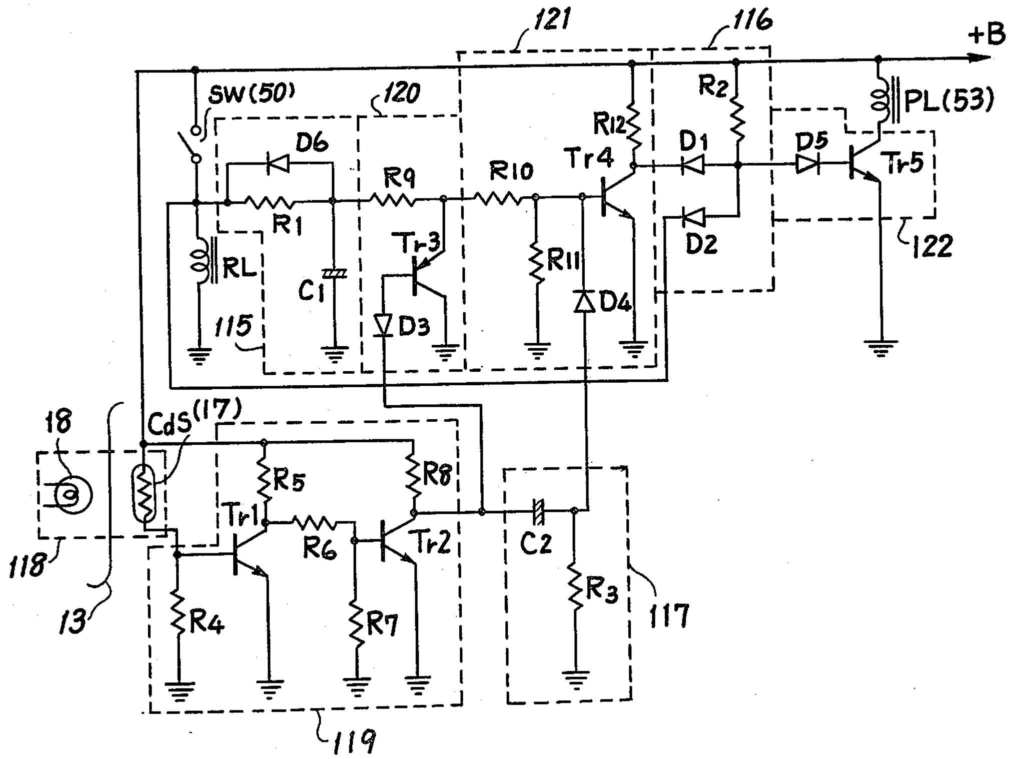
FIG. 4 is a circuit diagram of one embodiment of an electrical system for detection and control of the apparatus of the invention.

When the apparatus is stopped, as indicated in FIG. 1, the power source circuit for the apparatus is closed, and the lamp 18 shown in FIGS. 1 and 4 is lit. In this state, the control lever 23 is turned, as described hereinbefore, for changing the apparatus to recording/reproducing, rewinding, or fast forwarding. The microswitch SW is closed, and a relay RL is activated by a power source +B. As a consequence of the operation of the relay RL, both the main motor 51 and the loading motor 52 are operated, or only the main motor 51 is operated, in accordance with the above mentioned control. The apparatus is thus placed in the recording-/reproducing state, shown in FIG. 2. In the fast forwarding state, the tape 13 travels in the forwarding. Or, in the rewinding state, tape travel is in the normal playing or reverse direction within the cassette 10.

When the control lever 23 is manipulated, the photocell CdS exhibits a high resistance value since the light from the lamp 18 is shut off by the tape 13. Consequently, the transistor $Tr_1$ is "OFF", and the transistor $Tr_2$ is "ON". The collector output of the transistor $Tr_2$ is set at a low level. This collector output is applied by way of the diode $D_3$ to the base of the PNP transistor $Tr_3$, which is thereby turned "ON," and the switching circuit 120 is operated. Furthermore, this collector output is applied by way of the differential circuit 117 and the diode $D_4$ to the base of the NPN transistor $Tr_4$, which is thereby switched "OFF". The collector potential thereof is held at a high value. For this reason, the AND gate 116 is supplied with a voltage of high potential for the diode $D_1$.

As a further result of the closing of the switch SW, a positive voltage is supplied to the other diode $D_2$ of the AND gate 116, which gate sends a voltage to the solenoid driving circuit. The output voltage of the AND gate 116 is applied through the diode $D_5$ to the base of the transistor $Tr_5$, which becomes conductive. Consequently, a solenoid PL is activated, and the control lever 23 is locked in a specific control position as described hereinbefore, the switch SW being held in its closed state.

As another result of the closed switch SW, a voltage of a specific level is produced as an output from the delay circuit 115 after the elapse of a predetermined time (approximately 3 seconds in the instant embodiment), which is determined by the time constant of the resistor $R_1$ and capacitor $C_1$. This output, however, is grounded by the transistor $Tr_3$ in its conductive state and is not applied to the transistor $Tr_4$, which is therefore held in its nonconductive state. The closed state of the switch SW is continued throughout the period during which the transistor $Tr_4$ is maintained in the nonconductive state, that is, the period during which the photocell CdS is shielded by the tape 13 from the light of the lamp 18.

At the time of the recording/reproducing operation or the fast-forwarding operation, the magnetic tape 13 passes between the lamp 18 and the photocell CdS (17), as it is driven to travel in the normal playing or forwarding direction. The magnetic tape 13 is drawn out from the supply tape roll 11 to the vicinity of the terminal end. The transparent leader part 110 reaches the point between the lamp 18 and the photocell 17, and the light from the lamp 18 passes through the transparent leader part 110 and onto the photocell 17. The resistance value of the photocell 17 (CdS in FIG. 4) thereupon decreases, and the base potential of the transistor $Tr_1$ rises. As a consequence, the transistor $Tr_1$ is rendered conductive, while the transistor $Tr_2$ is switched to its nonconductive state, and its collector potential rises substantially to the power source voltage +B. This collector potential passes through the differential circuit 117 to be converted into a positive pulse signal and, moreover, passes through the diode $D_4$ to be applied to the base of the transistor $Tr_4$.

Consequently, the transistor $Tr_4$ is temporarily made conductive, and this collector potential decreases. Accordingly, the AND gate 116 produces no output voltage, whereby the voltage heretofore supplied to the base of the transistor $Tr_5$ is cut off. The transistor $Tr_5$ is thereupon turned "OFF", and the solenoid PL(53) is deenergized.

As a result, the control lever 23 is released from its locked state with respect to the playing cam 24 or the fast forwarding and rewinding cam 100 and is returned by a spring (not shown) to the stopped position indicated in FIG. 1. Interrelatedly with this operation, the microswitch 50 (SW in FIG. 4) is opened, and the relay RL is released. The switch SW opens and cuts off the supply of positive voltage for the diode $D_2$. After a short period, the transistor $Tr_4$ is again turned "OFF." Even if a positive voltage is supplied for the diode $D_1$, the AND gate 116 is held off, and the transistor $Tr_3$ is held nonconductive.

As a result of the release of relay RL, the loading motor 52 rotates in the direction which is reverse to that at the time of loading, when the apparatus is recording/reproducing, as indicated in FIG. 2. The various parts of the loading means are operated in their respective directions in a sequence which is reverse to those occurring at the time of loading, and thus the parts are returned to their original positions. At this time, the clockwise rotation of the pulley 58 driven by the main motor 51 is being transmitted as a counterclockwise rotation to the supply reel disc 19, with transmission being by way of the belt 59, driving roller 42, roller 104, and roller 21. For this reason, the magnetic tape 13 drawn out of the cassette 10, at the time of unloading operation, is wound successively on the supply tape roll 11, thereby to be accommodated within the cassette 10. Then, upon completion of the unloading operation, the apparatus is stopped, as indicated in FIG. 1.

In the case where the apparatus is placed in the fast forwarding operation state, the driving roller 103 is separated from the take-up reel disc 20, and the main motor 51 no longer applies power, whereby the tape 13 is not driven, and the apparatus returns to the stopped state, shown in FIG. 1.

With the apparatus in the rewinding state and the tape 13 traveling in the reverse direction within the cassette 10, the tape 13 is drawn from the take-up tape roll 12 to the vicinity of its terminal end part. The transparent leader tape part 111 is detected by the detection device 118 comprising the lamp 18 and the photocell 17. In this case also, similarly as described above, the control lever 23 is unlocked, and the switch 50 (SW in FIG. 4) is opened. Accordingly, the main motor 51 does not operate, and the driving roller 103 separates from the supply reel disc 19. The tape 13 thereby stops traveling, and the apparatus is stopped, as indicated in FIG. 1.

The following is a description of the operation when a cassette 10 is in a winding state and the entire tape 13 is wound on the supply spool 112 or the take-up spool 113. The transparent leader part 111 or 110 is drawn out to the front face of the cassette and inserted into the apparatus, which is then placed in the recording/reproducing, fast-forwarding, or rewinding state.

First to be described is the operation when the tape 10 is in the tape winding state and the transparent leader part 110, with its end fixed to the supply spool 112, is confronting the opening on the front face of the cassette 10. The cassette is inserted into the loading position in the apparatus. The apparatus is placed in the recording/reproducing state or the fast-forwarding state. When the control lever 23 is placed in the recording/reproducing position or the fastforwarding position, the light from the lamp 18, passes through the transparent leader tape part 110, and falls onto the photocell CdS, which thereby exhibits a low resistance value. Accordingly, the transistors $Tr_1$ and $Tr_2$ are respectively "ON" and "OFF." The collector potential of the transistor $Tr_2$ is at a high value. This collector potential is passed through the differential circuit 117 to be made substantially OV and is applied to the base of the transistor $Tr_4$, which is switched "OFF" similarly, as when the detection device detects the tape 13.

For this reason, when the switch SW is closed by the manipulation of the control lever 23 to set an operational mode, the AND gate 116 produces an output voltage. The transistor $Tr_5$ is turned "ON," thereby activating the solenoid PL. The control lever 23 is thus locked in the operational mode position. As another result of the closing of the switch SW, the relay RL is operated. The main motor 51 (as well as the loading motor at the time of reproducing or playing) operates. The apparatus thus operates according to the controlled operational mode. The tape 13 is driven in the normal direction, the transparent leader tape part 110 being further drawn out from the supply spool 112. At the time of the above described operation, the detection device 118 continues thereafter to detect the transparent leader part 110. The transistors $Tr_2$ and $Tr_3$ are both placed in their nonconductive state.

As still another result of the closing of the switch SW, the voltage applied to the relay RL passes through the resistor $R_1$ and charges the capacitor $C_1$, the voltage of which rises to a specific level after a specific time. At this specific level, the voltage is an output from the delay circuit 115, after being delayed by a delay time determined by the time constant of the resistor $R_1$ and capacitor $C_1$. Since the transistor $Tr_3$ is turned "OFF" at this time, as mentioned above, the output signal from the delay circuit 115 is applied through the resistor $R_{10}$ to the base of the transistor $Tr_4$, which is thereby rendered conductive. The output signal of the circuit 115 is thus applied to the base of the transistor $Tr_4$ without being affected in any way by the capacitor $C_2$, as a result of the diode $D_4$.

For this reason, the AND gate 116 produces no output voltage, and the transistor $Tr_5$ is switched off. Furthermore, the solenoid PL (53) is deenergized, whereby the control lever 23 is unlocked. Accordingly, the apparatus is stopped, as indicated in FIG. 1 after continuation for a certain time of the loading operation or the fast-forwarding operation preceding the recording/reproducing operation.

The relationship between the length of the transparent leader tape part 110 and the delay time of the delay circuit 115 is so selected that, when the tape 13 has been driven to travel in the normal direction by a distance corresponding to the delay time, one part of the transparent leader tape part 110 is still wound around the supply spool 112.

As a result, if the transparent leader tape part 110 is already drawn out from the supply spool 112 at the time of cassette loading, and if the apparatus is placed in the playing or fast-forwarding state, the tape 13 is driven in the normal direction. Although being changed over to an operational state, the apparatus is stopped before the terminal end of the leader tape part 110 is discharged. This presents undesirable occurrences, such as the separation of the end of the leader tape part 110 from the hub of the spool 112.

Next to be described is the operation wherein a cassette 10 is placed in a winding state when almost all of the tape 13 is already wound around the take-up spool 113. The transparent leader tape part 110 is confronting the front face of the cassette and is inserted into the loaded position in the apparatus, which is then set in the rewinding mode. The tape 13 is driven in the reverse direction. When the control lever 23 is manipulated to the rewinding position, the photocell CdS exhibits a low resistance value similarly as described above. The collector potential of the transistor $Tr_2$ is at a high value. Consequently, the transistors $Tr_3$ and $Tr_4$ are both in the nonconductive state.

When the control lever 23 is manipulated to the rewinding position, the solenoid PL (53) is activated in the same manner, as described above. The control lever 23 is locked in the rewinding position. Thus, the apparatus is set in the rewinding mode. In the initial period of the rewinding operation, the transparent leader tape part 110 is interposed between the photocell CdS (17) and the lamp 18. The collector potential of the transistor $Tr_2$ is maintained at a high value. The transistors $Tr_3$ and $Tr_4$ are both held in the nonconductive state.

Furthermore, as a result of the rewinding operation, the transparent leader tape part 110 is completely taken up on the supply spool 112 after the elapse of a predetermined time following the control manipulation of the control lever 23. A part near the end of the opaque tape 13 is disposed at the detection device 118. For this reason, the transistors $Tr_1$ and $Tr_2$ are respectively placed in their nonconductive and conductive states. Consequently, the collector potential of the transistor $Tr_2$ decreases, and the transistor $Tr_2$ becomes conductive, the output side of the delay thereby being grounded. As a further consequence, an output signal of a specific level is sent out from the delay circuit 115, after, having been delayed by a specific delay this signal is grounded by the transistor $Tr_3$ and is not applied to the base of the transistor $Tr_4$.

When the detection device 118 detects the change from the leader tape part 110 to the magnetic tape 13, and the transistor $Tr_2$ is changed over from "OFF" to "ON," a negative pulse signal is produced as an output of the differential circuit 117. This pulse signal, however, is suppressed by the diode $D_4$, and the transistor $Tr_4$ is maintained in the nonconductive state.

Accordingly, the transistor $Tr_4$ is in the nonconductive state, and the AND gate 116 produces an output voltage. Consequently, the transistor $Tr_5$ is maintained in its conductive state. The control lever 23 is retained in its locked state in the rewinding position, by the solenoid PL (53). Accordingly, the apparatus is maintained in the rewinding operational mode, and the tape 13 is driven in the reverse direction of travel. The rewinding operation thus continues until almost all of the tape 13 has been wound on the supply spool 112. The transparent leader tape part 111, fixed at one end to the take-up spool 113, is drawn out between the photocell 17 and the lamp 18, whereupon the apparatus is stopped, as described hereinbefore.

The above mentioned delay time is determined by the resistor $R_1$ and the capacitor $C_1$. After the elapse of this delay time from the time of the rewinding operation, the transparent leader tape part 110 is wound on the supply spool 112. The opaque magnetic tape 13 confronts the front face of the cassette.

The control operation of the apparatus also carried out in the same manner as described above, at the time when the cassette is inserted into the loaded position and the tape 13 is almost completely wound on the supply spool 112. The transparent leader tape part 111 anchored at one end to the take-up spool 113 is confronting the opening at the front face of the cassette 10. More specifically, the drawing of the transparent leader tape part 111 further out of the take-up spool 113, that is, the rewinding operation, is automatically stopped after the elapse of the predetermined time, and before the leader tape part 111 is drawn out to the anchored terminal end thereof. The separation of this end of the leader tape part 111 from the hub part of the spool 113 is prevented.

Accordingly, as in the recording/reproducing and fast-forwarding operations, the operation of the winding of the tape 13 driven in the normal direction and being wound on the spool 113 is continued until almost all of the tape 13 is wound on the spool 113. The transparent leader tape part 110 drawn out from the spool 112 is detected by the detection device, whereupon the apparatus is stopped, as described hereinbefore.

In accordance with the present invention, as described above, the apparatus is placed in an operating state responsive to a control action. At the time of control manipulation, the detection device 118 is already detecting the transparent leader tape part 110 or 111. This is similar to the detection device 118 detecting the opaque magnetic tape 13. The tape 13 is driven to travel in the normal direction or the reverse direction. Then, after the elapse of the predetermined time, if the detection device is still detecting the leader tape part 110 or 111, the apparatus is stopped, whereby the tape 13 stops traveling. The separation of the terminal end parts of the leader tape parts 110 and 111, respectively, from the hubs of the supply and take-up spools 112 and 113 is prevented.

On one hand, after the elapse of the predetermined time, the apparatus is maintained in the operational state into which it has been controlled. The travel of the tape 13 is continued without any problem while the detection device 118 is detecting the opaque tape 13. Accordingly, by ascertaining whether or not the operational state is being continued, the operator can determine the state of the winding of the tape within the cassette 10. Prior to loading, there is no necessity of determining whether the tape within the cassette is wound normal or whether it is abnormal.

In the above described embodiment, transparent leader tape parts 110 and 111 of specific length are provided as tape-shaped structures to be detected between the ends of the magnetic tape 13 and the supply and take-up spools 112 and 113. An optical discrimination between the magnetic tape 13 and the tape-like structures 110 and 111 is detected. As another embodiment of means for this purpose, electroconductive sensing tape pieces of specific lengths are spliced to the terminal ends of the magnetic tape, and means for detecting these electroconductive sensing tape pieces are provided in positions to contact the tape, thereby to detect the end parts of the magnetic tape. It will be apparent that various other means for detecting the end parts of the magnetic tape are also possible.

Further, this invention is not limited to these embodiments but variations and modifications may be made without departing from the scope and spirit of the invention.

What is claimed is:

1. A recording and/or reproducing apparatus having an automatically stopping capability, said apparatus comprising:

a tape structure wound at two ends thereof respectively around supply and take-up spools, means for driving said tape in forward and reverse directions depending on the operational mode of the apparatus, said tape structure comprising a tape recording medium part and detectable tape leader parts respectively fixed to the two ends of the recording medium part, said leader parts being anchored to the hubs of said supply and take-up spools;

operation means for manipulatively changing over the apparatus from its stopped mode to its operational mode;

detection means for discriminatingly detecting the recording medium part and the detectable leader parts of the tape structure;

control means for producing a control output signal when the detection means detects a change of the tape structure while it is traveling during the operational mode of the apparatus, said control means producing the control output signal when said part of the tape structure confronting the detection means is said detachable leader part at the instant when said operational mode starts, and when said detectable leader part is detected for a period having a duration exceeding a predetermined period, said control means producing no control output signal when the detection means detects said detectable part at the instant when the operational mode starts, and when said detectable leader part changes to the recording medium part within a predetermined time; and mode changing means operating in response to said control output signal to change over the apparatus from the operational mode to the stopped mode.

2. The apparatus as set forth in claim 1 in which there is further provided holding means for holding and locking said operation means in a manipulative control position, and said mode changing means comprises solenoid means operating in response to said control output signal of said automatic control means to terminate the holding and locking action of said holding means.

3. An automatically stopping, recording and/or reproducing apparatus comprising:

a tape structure wound at two ends thereof respectively around supply and take-up spools to be driven in forward and reverse directions depending on the operational mode of the apparatus and comprising a tape recording medium part and a detectable tape leader part respectively fixedly spliced to each of the two ends of the recording medium part, said leader parts being anchored to the hubs of said supply and take-up spools;

operation means for manipulatively changing over the apparatus from its stopped mode to its operational mode;

detection means for discriminatingly detecting the recording medium part and the detectable leader parts of the tape structure;

control means for producing a control output signal when the detection means detects a change of the tape structure while it is traveling during the operational mode of the apparatus, and said control means producing no control output signal when said leader is detected at the instant of a start of said operational mode, and continues to be detected for a period exceeding a predetermined period; and mode changing means operating in response to said control output signal to change over the apparatus from the operation mode to the stopped mode, said control means comprising a switch closed by a manipulation of the operation means, a delay circuit for producing a delay output after the elapse of a predetermined time following a closure of said switch, means for producing the control output signal for operating said mode changing means when, at the time of closure of said switch, there is an output from said delay circuit and an output resulting from the detection by the detection means of the change of the tape structure from the recording medium part to the detectable leader part, and means for shutting off the supply of the output of the delay circuit to the control output producing means while the detection means is detecting the recording medium part.

4. An automatically stopping, recording and/or reproducing apparatus as set forth in claim 3 in which the length of the predetermined delay time of the delay circuit and the length of the detectable part are so selected interrelatedly that at least said detachable part is sent out further from the position of the boundary of the recording medium part, whereby the detectable part is still being sent out after the elapse of said predetermined time from the start of the operation of the apparatus.

* * * * *